(12) United States Patent
Fujita et al.

(10) Patent No.: US 12,405,429 B2
(45) Date of Patent: Sep. 2, 2025

(54) CLEANING TOOL

(71) Applicant: Fujikura Ltd., Tokyo (JP)

(72) Inventors: Shunsuke Fujita, Chiba (JP);
Kunihiko Fujiwara, Chiba (JP);
Masashi Ohshima, Chiba (JP)

(73) Assignee: Fujikura Ltd., Tokyo (JP)

( * ) Notice: Subject to any disclaimer, the term of this patent is extended or adjusted under 35 U.S.C. 154(b) by 481 days.

(21) Appl. No.: 17/624,869

(22) PCT Filed: Aug. 20, 2020

(86) PCT No.: PCT/JP2020/031501
§ 371 (c)(1),
(2) Date: Jan. 5, 2022

(87) PCT Pub. No.: WO2021/065239
PCT Pub. Date: Apr. 8, 2021

(65) Prior Publication Data
US 2022/0276448 A1    Sep. 1, 2022

(30) Foreign Application Priority Data

Oct. 1, 2019  (JP) ................ 2019-181384
Oct. 1, 2019  (JP) ................ 2019-181385

(51) Int. Cl.
*G02B 6/38* (2006.01)
*B08B 7/00* (2006.01)

(52) U.S. Cl.
CPC ......... *G02B 6/3866* (2013.01); *B08B 7/0028* (2013.01); *B08B 2240/02* (2013.01); *G02B 6/3853* (2013.01)

(58) Field of Classification Search
CPC ......... B08B 2240/02; B08B 1/00; B08B 1/30; B08B 1/143; G02B 6/3866; G02B 6/3807; A47L 25/00
See application file for complete search history.

(56) References Cited

U.S. PATENT DOCUMENTS

| 2003/0098045 | A1 | 5/2003 | Loder et al. |
| 2011/0229087 | A1* | 9/2011 | Cody ............ G02B 6/4292 |
| | | | 385/78 |

(Continued)

FOREIGN PATENT DOCUMENTS

| CN | 105122108 A | 12/2015 |
| CN | 107405651 A | 11/2017 |

(Continued)

OTHER PUBLICATIONS

International Search Report issued in corresponding International Application No. PCT/JP2020/031501 dated Oct. 13, 2020 (2 pages).

*Primary Examiner* — Eric J Rosen
*Assistant Examiner* — John C Merino
(74) *Attorney, Agent, or Firm* — Osha Bergman Watanabe & Burton LLP

(57) ABSTRACT

A cleaning tool includes: a head; and a cleaning body wrapped around the head. The head includes: a head body; and a projection that projects from the head body. The projection is retractable relative to the head body. The head may further include an elastic member that restores a positional relationship between the projection and the head body.

10 Claims, 12 Drawing Sheets

(56) References Cited

U.S. PATENT DOCUMENTS

| | | | |
|---|---|---|---|
| 2012/0017384 A1* | 1/2012 | Fujiwara | G02B 6/3866 |
| | | | 15/97.1 |
| 2016/0041345 A1* | 2/2016 | Kamouchi | B08B 1/00 |
| | | | 15/97.1 |
| 2018/0231717 A1 | 8/2018 | Takanashi et al. | |

FOREIGN PATENT DOCUMENTS

| | | |
|---|---|---|
| CN | 109804286 A | 5/2019 |
| CN | 109906394 A | 6/2019 |
| JP | 2008-151843 A | 7/2008 |
| JP | 2014-521996 A | 8/2014 |
| JP | 2016-172222 A | 9/2016 |
| JP | 2017-049397 A | 3/2017 |
| JP | 6498814 B1 | 4/2019 |
| WO | 2014/141405 A1 | 9/2014 |

* cited by examiner

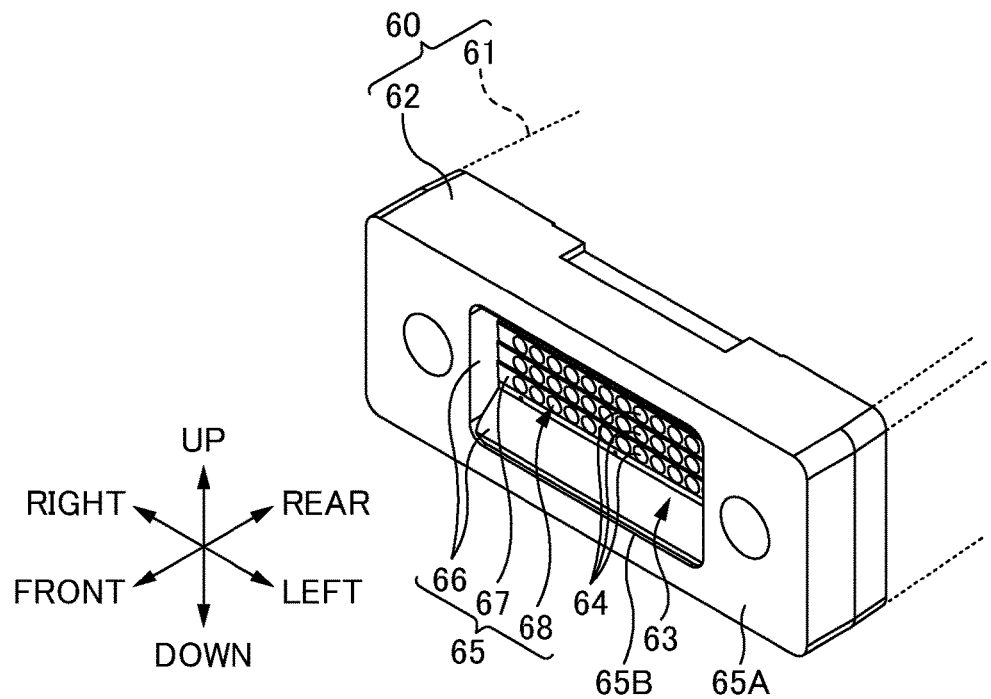
FIG. 4A
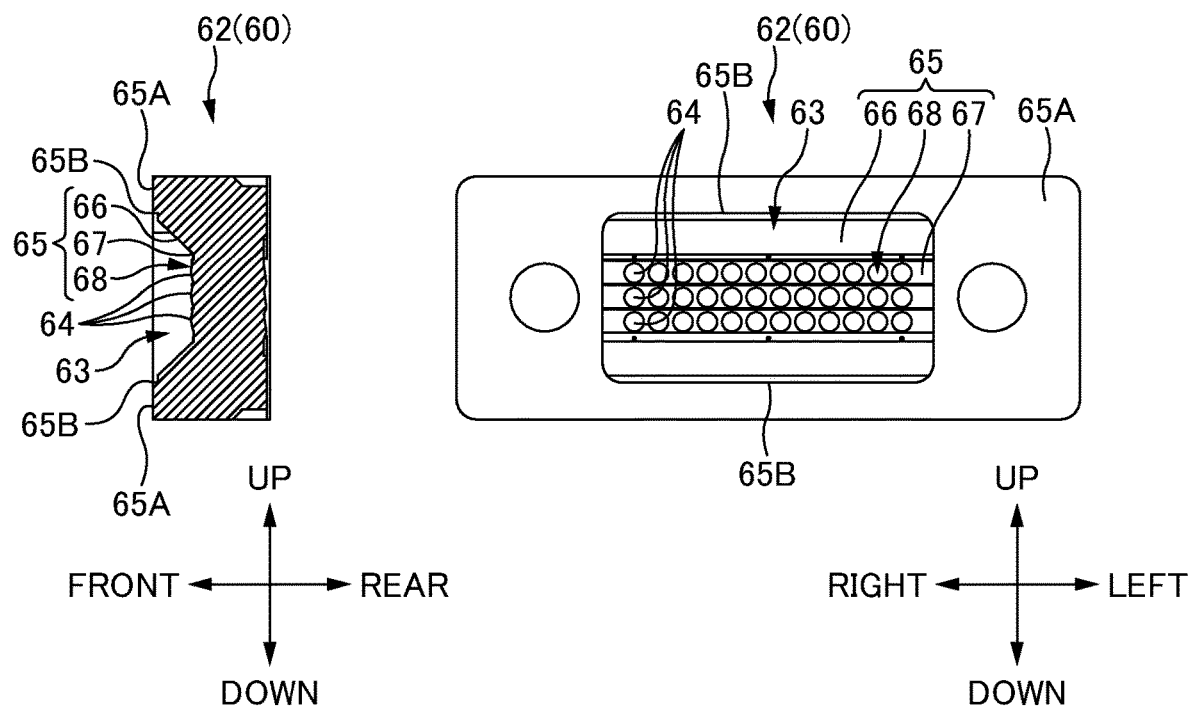
FIG. 4B
FIG. 4C

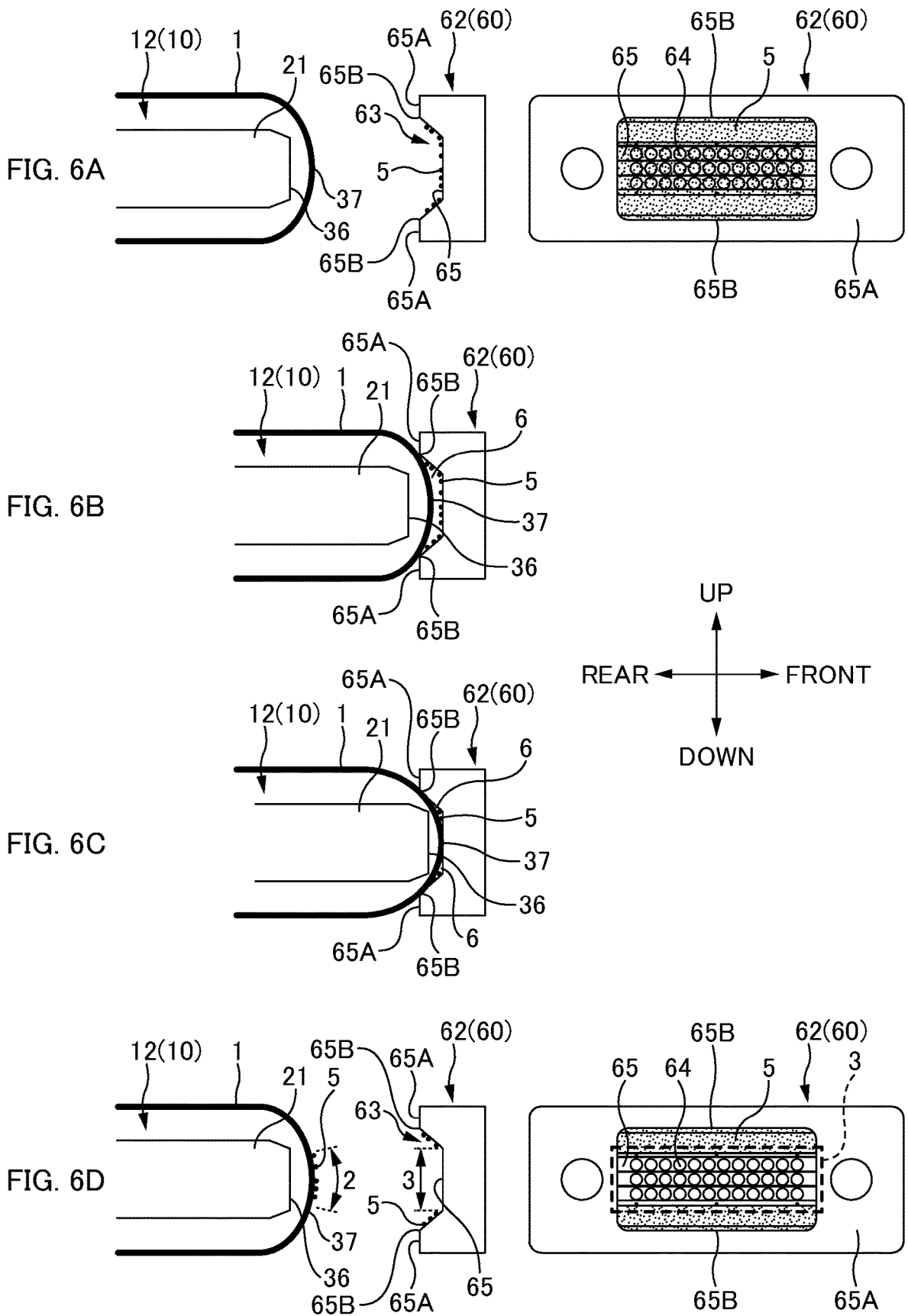

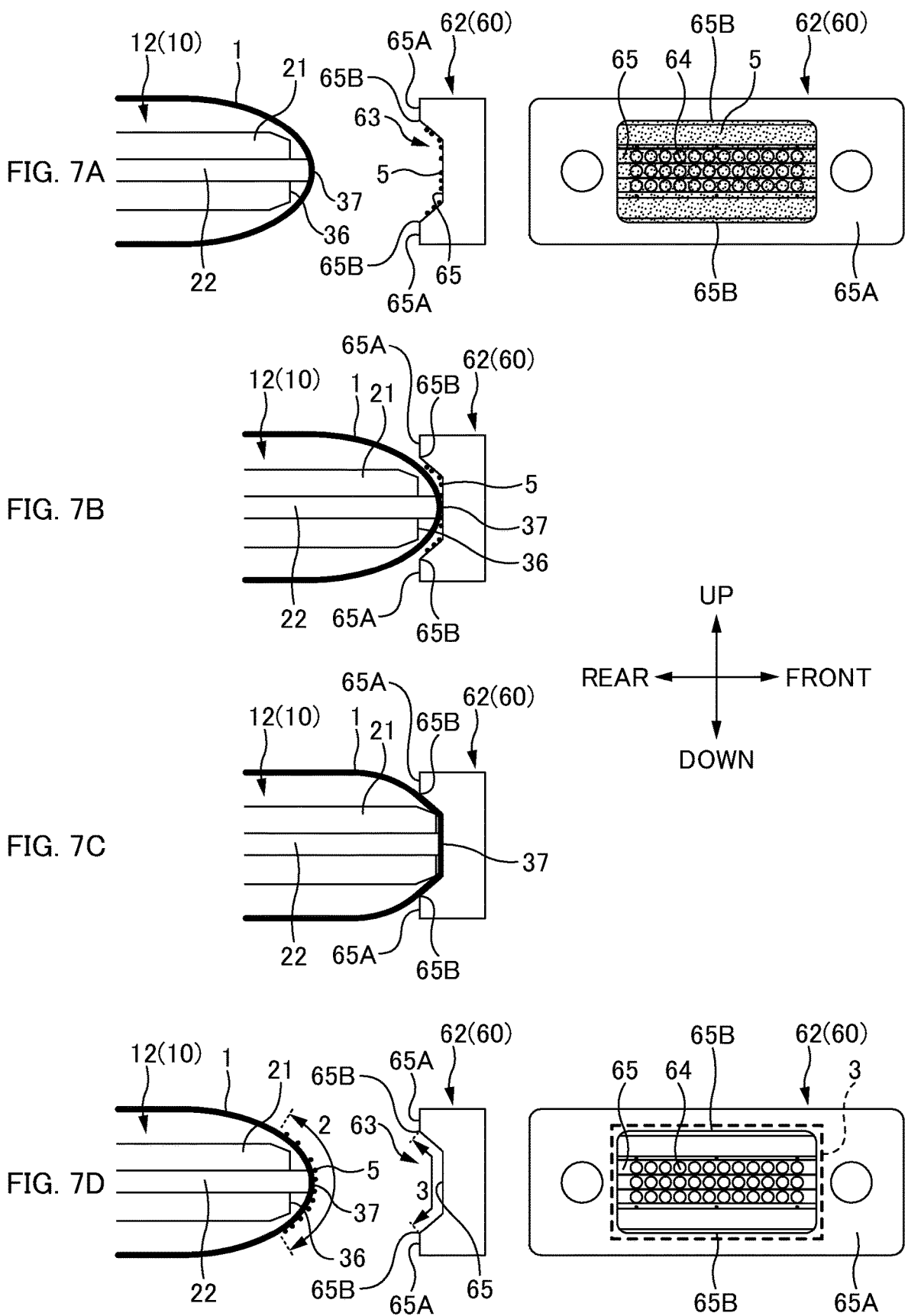

CLEANING TOOL

TECHNICAL FIELD

The present invention relates to a cleaning tool.

BACKGROUND

If waste is attached to the end face of a ferrule when an optical connector is connected, such waste may cause damage to the end face of the ferrule or increase the amount of coupling loss. For this reason, a cleaning tool is used to clean the end face of the ferrule before connecting the optical connector.

As one example of what is cleaned by such a cleaning tool, Patent Documents 1 and 2 disclose what is known as a lens coupling type of ferrule, in which a recess is formed in the front end face of the ferrule, and a lens is arranged at the bottom surface of the recess. Also, as one example of a cleaning tool for cleaning a lens coupling type of ferrule, Patent Document 3 discloses a cleaning tool that has a head around which adhesive tape is wrapped, and cleaning is performed by pressing the tape against a lens.

CITATION LIST

Patent Document

[Patent Document 1] JP 2008-151843A
[Patent Document 2] JP 2014-521996A
[Patent Document 3] JP 6498814B Because a lens coupling type of ferrule has a structure in which a lens is arranged at the bottom surface of a recess, when the tape is pressed against the lens, the tape may first come into contact with the edge of the recess. At this time, air may become trapped in the recess by the tape, and thus the tape may not be pressed against the entirety of the inner surface of the recess. As a result, actual cleaned region cleaned by the tape might be decreased.

SUMMARY

One or more embodiments of the present invention suppresses the decreasing of a cleaned region in a lens coupling type of ferrule.

One or more embodiments of the present invention relate to a cleaning tool comprising: a head around which a cleaning body is wrapped, wherein the head includes a head body, and a projection configured to project from the head body, wherein the projection is retractable relative to the head body.

Other features of the present invention will become apparent from the following description of the present specification and the drawings.

According to one or more embodiments of the present invention, it is possible to suppress decreasing a cleaned region in a lens coupling type of ferrule.

BRIEF DESCRIPTION OF THE DRAWINGS

FIG. 4A is a perspective view of the ferrule 60. FIG. 4B is a cross-sectional view of a lens plate 62 of the ferrule 60. FIG. 4C is a front view of the lens plate 62 of the ferrule 60.

FIGS. 6A to 6D are illustrative views showing how a cleaning tool 10 of a comparative example is used to clean the lens plate 62.

FIGS. 7A to 7D are illustrative views showing how the cleaning tool 10 of one or more embodiments is used to clean the lens plate 62.

DETAILED DESCRIPTION

Figure 1:
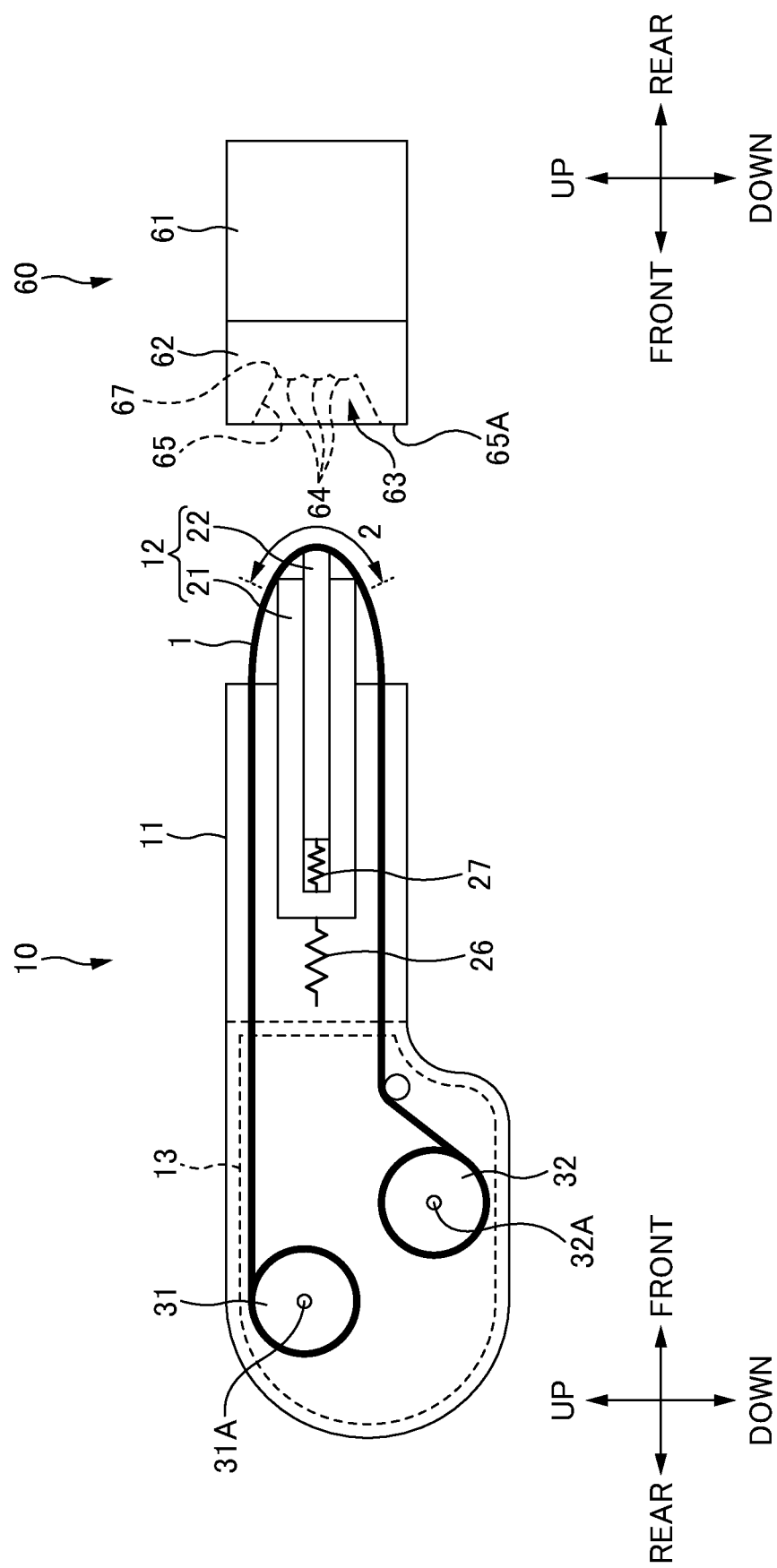
FIG. 1 is an overall illustrative view of a cleaning tool 10 and a ferrule 60 in one or more embodiments.

At least the following matter will become apparent from the following description of the present specification and the drawings.

A cleaning tool will become clear comprising: a head around which a cleaning body is wrapped, wherein the head includes a head body, and a projection configured to project from the head body, wherein the projection is retractable relative to the head body. According to this cleaning tool, it is possible to suppress decreasing a cleaned region in the lens coupling type of ferrule.

In one or more embodiments, the head further includes an elastic member configured to restore a positional relationship between the projection and the head body. Accordingly, after the projection has retracted relative to the head body, the projection can be easily returned to the original position.

In one or more embodiments, before the head is pressed against an optical connector, a first state in which an end face of the projection is at a predetermined position relative to an end face of the head body is changed to a second state in which the end face of the projection projects from the end face of the head body by a greater amount than in the first state, and after the head is pressed against the optical connector, the second state is changed to the first state by the projection retracting relative to the head body. Accordingly, it is possible to prevent the projection from being damaged by the conveying of the cleaning body.

In one or more embodiments, the cleaning tool, further comprises: a feeding mechanism configured to convey the cleaning body to the head, wherein the feeding mechanism conveys the cleaning body to the head in the first state. Accordingly, it is possible to prevent the projection from being damaged by the conveying of the cleaning body.

In one or more embodiments, the cleaning tool further comprises: a tube body that is movable relative to the head and houses inside the head, wherein the optical connector includes a ferrule and a housing that houses inside the ferrule, and the first state is changed to the second state by the tube body coming into contact with the housing, being subjected to a pressing force from the housing, and retracting relative to the head. Accordingly, the end face of the projection can be moved so as to project from the end face of the head body with a simple motion.

In one or more embodiments, the head includes a pressing surface configured to press the cleaning body against a ferrule, the pressing surface including a head body side pressing surface located in the head body, and a projection side pressing surface located in the projection, and a region of the projection side pressing surface is one portion, with respect to a conveying direction of the cleaning body, of a total region of the pressing surface of the head. Accordingly, it is possible to suppress the case where air becomes trapped between the cleaning body and the ferrule when the cleaning body is pressed against the ferrule.

In one or more embodiments, the region of the projection side pressing surface is one portion, with respect to a direction perpendicular to the conveying direction of the cleaning body, of the total region of the pressing surface of the head. This makes it possible to further suppress the case where air becomes trapped between the cleaning body and the ferrule when the cleaning body is pressed against the ferrule.

In one or more embodiments, the ferrule is a lens coupling type of ferrule in which a lens is arranged at a bottom surface of a recess formed in the ferrule. This is especially advantageous in such a case.

In one or more embodiments, the cleaning body is constituted by a tape-shaped adhesive body. This makes it possible to bring the cleaning body into contact with the entirety of the face that has a convex portion such as a lens.

In one or more embodiments, a projecting end portion of the projection has a tapered shape. This makes it possible to further suppress the case where air becomes trapped between the cleaning body and the ferrule when the cleaning body is pressed against the ferrule.

Configurations of Cleaning Tool and Ferrule

FIG. 1 is an overall illustrative view of a cleaning tool 10 and a ferrule 60 of one or more embodiments.

In the following, the directions shown in the figures are sometimes used when describing the configurations and motions of the cleaning tool 10. Specifically, with respect to the cleaning tool 10, the direction in which a head 12 extends is the "front-rear direction", the side at the leading end of the head 12 is the "front" side, and the opposite side of the front side is the "rear" side. The axial direction of the rotation shaft of a take-up reel 32 (take-up reel support shaft 32A) is defined as the "left-right direction", the right-hand side in a view from the rear side toward the front side is the "right", and the opposite side (left-hand side) of the right is the "left" side. Also, the direction orthogonal to the "front-rear direction" and the "left-right direction" is the "up-down direction". Also, the terms "upstream" and "downstream" are sometimes used in accordance with the conveying direction of the cleaning body 1.

Also, the directions shown in the figures are sometimes used when describing the configuration of the ferrule 60. Specifically, the direction in which the head 12 of the cleaning tool 10 is pressed is the "front-rear direction", the side of the ferrule 60 where the lenses 64 are located (the connecting end face side of the optical connector) is the "front" side, and the opposite side is the "rear" side. Also, as shown in FIGS. 4A to 4C described later, the width direction of the ferrule 60 is the "left-right direction", and the thickness direction of the ferrule 60 is the "up-down direction".

When cleaning the ferrule 60, which is the member that is to be cleaned by the cleaning tool 10 of one or more embodiments, a cleaning body 1, which is wrapped around a head 12, is pressed against the ferrule 60. The ferrule 60 that is cleaned by the cleaning tool 10 of one or more embodiments is a lens coupling type of ferrule. As shown in FIG. 1, in the lens coupling type of ferrule, lenses 64 are arranged at a bottom surface 67 of a recess 63 formed in the ferrule 60. In the cleaning tool 10 of one or more embodiments, the ferrule 60 is cleaned by pressing a contact surface 2 of the cleaning body 1 against an inner surface 65 of the recess 63.

Cleaning Tool 10

Figure 2A:
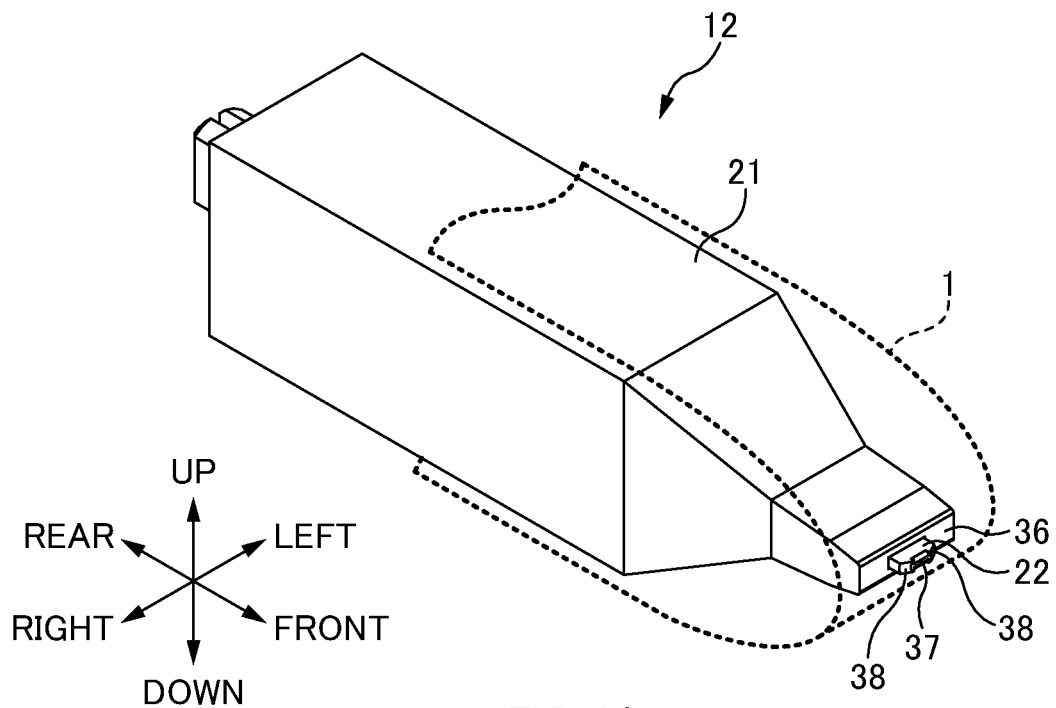
FIGS. 2A and 2B are perspective views of a head 12 in the cleaning tool 10 of one or more embodiments.
Figure 2B:
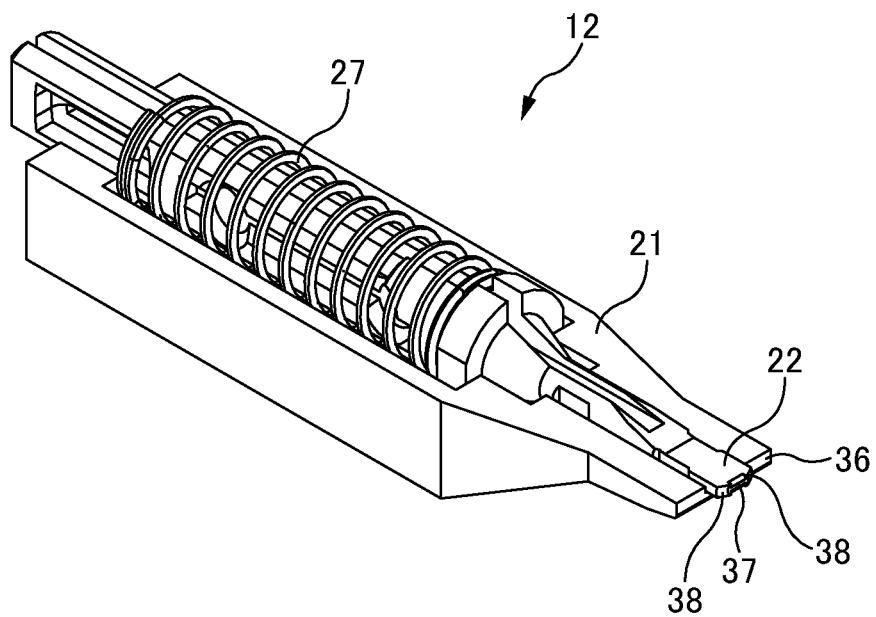
Figure 3A:
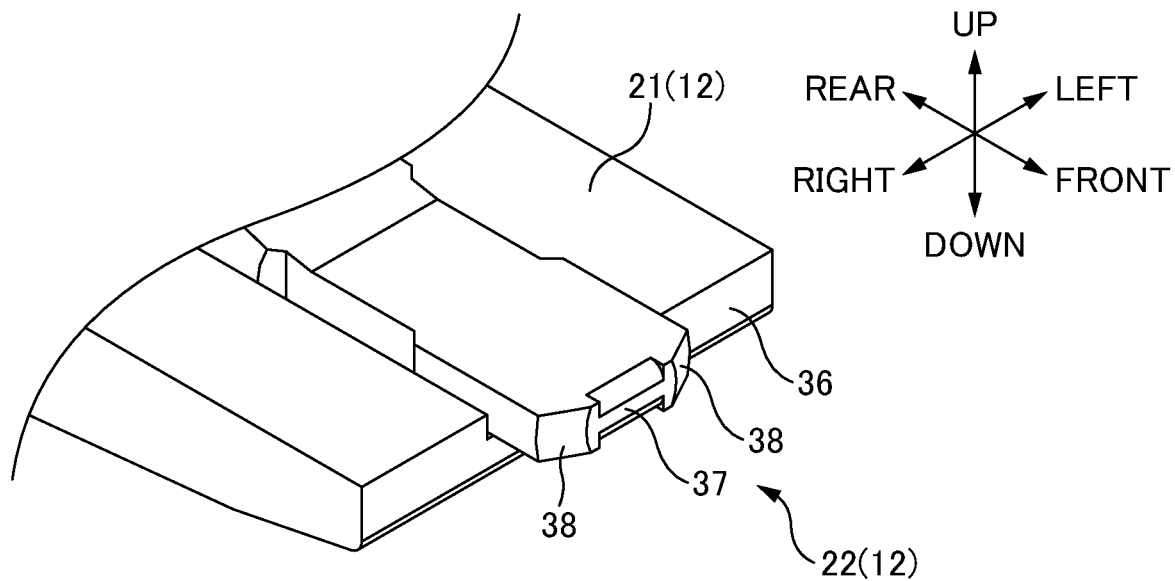
FIG. 3A is an enlarged perspective view of the vicinity of a projection 22 of the head 12.
Figure 3B:
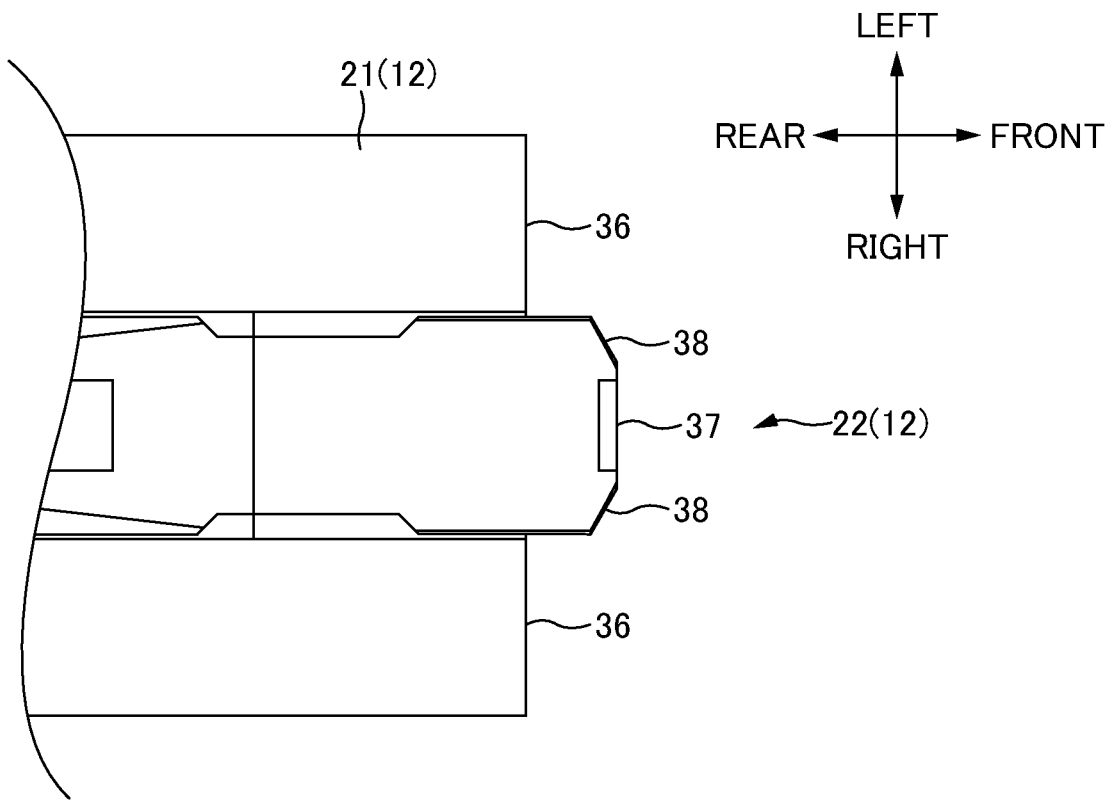
FIG. 3B is an enlarged plan view of the vicinity of the projection 22 of the head 12.

FIGS. 2A and 2B are perspective views of the head 12 in the cleaning tool 10 of one or more embodiments. FIG. 3A is an enlarged perspective view of the vicinity of a projection 22 of the head 12. FIG. 3B is an enlarged plan view of the vicinity of the projection 22 of the head 12. Note that in FIG. 2A, the cleaning body 1 is shown in a transparent manner, and the outer shape thereof is shown by dashed lines. FIGS. 2B to 3B show a state in which the upper half of a head main body 21 has been removed from the head 12. Hereinafter, the configuration of the cleaning tool 10 will be described with reference to FIG. 1 described above as well.

The cleaning tool 10 is a tool for cleaning the ferrule 60. As shown in FIG. 1, the cleaning tool 10 has a tube body 11, a head 12, a feeding mechanism 13, and a spring for head 26.

The tube body 11 is a member in which the head 12 is housed. When cleaning the ferrule 60 with use of the cleaning tool 10, an operator cleans the ferrule 60 by pressing the tube body 11 against a housing (not shown) in which the ferrule 60 is housed.

The head 12 is a member that presses the cleaning body 1 against the ferrule 60. One portion (front portion) of the head 12 extends from an opening located on the front side of the tube body 11, and is exposed to the outside of the tube body 11. The other portion (rear portion) of the head 12 is housed inside the tube body 11. As shown in FIG. 2A, the cleaning body 1 is wrapped around the head 12 from the upper side to the lower side. Note that in the cleaning body 1, the cleaning body 1 is conveyed from the upper side to the lower side (in the conveying direction) by the feeding mechanism 13. The head 12 has a head main body 21, a projection 22, and a spring for projection 27.

The head body 21 is a member that presses the cleaning body 1 against the ferrule 60, and is also a member that houses the projection 22 and the spring for projection 27. A head body side pressing surface 36 is located at the front end face of the head body 21. The head body side pressing surface 36 is the portion of the head body 21 that presses the cleaning body 1 against the ferrule 60. An opening is formed in a central portion of the head body side pressing surface 36, and the projection 22 projects through the opening. Also, the spring for projection 27 and a portion of the projection 22 are housed inside the head body 21. Note that the head body 21 is accommodating the projection 22 movably in the front-rear direction.

The projection 22 is a member that can move relative to the head body 21. As shown in FIGS. 2A to 3B, the front portion of the projection 22 projects from the front end face (head body side pressing surface 36) of the head body 21. The other portion of the projection 22 is housed inside the head body 21. It should be noted that a configuration is possible in which the front portion of the projection 22 does not project out from the opening, and the front portion of the projection 22 projects out only when the projection 22 moves forward relative to the head body 21.

A projection side pressing surface 37 is located at the front end face of the projection 22. The projection side pressing surface 37 is the portion of the projection 22 that presses the cleaning body 1 against the ferrule 60. As shown in FIG. 2A, the projection side pressing surface 37 is arranged at the central portion of the head body side pressing surface 36. Specifically, the region of the projection side pressing surface 37 occupies one portion, with respect to the up-down direction (the direction in which the cleaning body 1 is conveyed), of the total region of the head body side pressing surface 36. At the same time, the region of the projection side pressing surface 37 occupies one portion, with respect to the left-right direction (the direction perpendicular to the direction in which the cleaning body 1 is conveyed), of the total region of the head body side pressing surface 36. It should be noted that the region that the projection side pressing surface 37 occupies in the total region of the head body side pressing surface 36 is not limited to this, and various shapes can be employed as shown in variations of the head 12 (see FIGS. 8A to 8C) described later.

In one or more embodiments, the projecting end portion of the projection 22 has a tapered shape. Specifically, as shown in FIGS. 3A and 3B, tapered faces 38 are located on the left and right sides of the projection side pressing surface 37. However, the projecting end portion of the projection 22 is not required to have a tapered shape. Specifically, a configuration is possible in which the tapered faces 38 are not located on the left and right sides of the projection side pressing surface 37, and the projecting side end portion of the projection 22 is constituted by only the projection side pressing surface 37.

The spring for projection 27 is an elastic member for restoring the positional relationship between the projection 22 and the head body 21. The spring for projection 27 is arranged between the projection 22 and the rear inner wall face of the head body 21. Specifically, the front end portion of the spring for projection 27 is held by a flange portion located on the projection 22, and the rear end portion of the spring for projection 27 is held by a spring receiving portion located on the rear inner wall face inside the head body 21. When the projection 22 moves rearward relative to the head body 21 during cleaning of the ferrule 60, the spring for projection 27 undergoes compression deformation. When the compressed spring for projection 27 then undergoes restoration, the projection 22 moves forward relative to the head body 21 and returns to its original position. Because the head 12 includes the spring for projection 27, the projection 22 can move relative to the head body 21 and then be easily returned to the original position.

Also, the spring for projection 27 is also an elastic member for pressing the projection 22 forward. When the ferrule 60 is to be cleaned, the spring for projection 27 undergoes elastic deformation such that the cleaning body 1 wrapped around the projection 22 can be pressed against the ferrule 60 with a predetermined pressing force.

However, the head 12 might not have the spring for projection 27.

The feeding mechanism 13 is a mechanism that supplies an unused portion of the cleaning body 1 from the upstream side of the head 12, and feeds the used portion of the cleaning body 1 to the downstream side of the head 12. As shown in FIG. 1, the feeding mechanism 13 has a supply reel 31 and a take-up reel 32. The supply reel 31 is a reel that supplies an unused portion of the cleaning body 1. The unused portion of the cleaning body 1 is reeled around the supply reel 31. The supply reel 31 is rotatably supported by a supply reel support shaft 31A. The take-up reel 32 is a reel for reeling up and collecting the used portion of the cleaning body 1. The used portion of the cleaning body 1 is reeled around the take-up reel 32. The take-up reel 32 is rotatably supported by a take-up reel support shaft 32A.

The spring for head 26 is also an elastic member for pressing the head 12 forward. When the ferrule 60 is to be cleaned, the spring for head 26 undergoes elastic deformation such that the cleaning body 1 wrapped around the head 12 can be pressed against the ferrule 60 with a predetermined pressing force. Note that in one or more embodiments, the elastic force of the spring for head 26 is stronger than the elastic force of the spring for projection 27.

Ferrule 60

FIG. 4A is a perspective view of the ferrule 60. FIG. 4B is a cross-sectional view of a lens plate 62 of the ferrule 60. FIG. 4C is a front view of the lens plate 62 of the ferrule 60. Note that FIG. 4B shows a cross section in which a portion of the lens plate 62 in which the recess 63 is formed has been cut along a plane perpendicular to the left-right direction.

The ferrule 60 is a member that holds the end portions of optical fibers. The ferrule 60 of one or more embodiments is a lens coupling type of ferrule. The lens coupling type of ferrule is a ferrule that can optically connect the end portions of optical fibers to each other without physically bringing them into contact with each other, by using a lens that allows light to enter and exit the end portions of the optical fibers. However, the ferrule 60 is not required to be a lens coupling type of ferrule.

The ferrule 60 includes a ferrule body 61 and the lens plate 62.

The ferrule body 61 is a member that holds the end portions of the optical fibers in the ferrule 60. The ferrule body 61 is arranged behind the lens plate 62.

The lens plate 62 is a member on which lenses 64 are arranged. The lens plate 62 is made of a transparent resin that transmits optical signals. As shown in FIG. 4A, the lens plate 62 is arranged on the front side of the ferrule body 61, with the rear end face of the lens plate 62 in contact with the front end face of the ferrule body 61. Note that the end portions of the optical fibers held by the ferrule body 61 abut against the rear end face of the lens plate 62. The lens plate 62 includes the lenses 64 and a front end face 65A.

The lenses 64 are lenses arranged in correspondence with the end portions of the optical fibers held by the ferrule body 61. Optical signals are input and output to and from the end portions of the optical fibers via the lenses 64. The lenses 64 are formed as convex lenses. As shown in FIGS. 4B and 4C, the lenses 64 of one or more embodiments are arranged in a plurality of (here, three) rows of lenses 64 arranged in the up-down direction, and each row includes a plurality of (12 in this case) lenses 64 arranged in the left-right direction. However, the number of and arrangement of the lenses 64 are not limited to this. The lenses 64 are arranged in one-to-one correspondence with the end portions of the optical fibers held by the ferrule body 61.

The lenses 64 are each formed so as to function as a collimating lens, for example. Because an optical signal enters and exits with a diameter increased by the lens 64, the optical signal propagates as collimated light, and therefore a stable connection can be made even if waste has entered between two ferrules 60, thus making it possible to suppress optical signal transmission loss. Also, because an optical signal enters and exits with a diameter increased by the lens 64, the optical signal propagates as collimated light, and therefore even if the optical signal optical paths become misaligned between two ferrules 60, it is possible to suppress optical signal transmission loss.

The lenses 64 are formed on the front side of the lens plate 62 (ferrule 60). The lenses 64 are arranged on the inner surface 65 of the recess 63 formed in the lens plate 62 in order to prevent the convex lenses 64 from coming into contact with each other when two ferrules 60 are connected face-to-face. The recess 63 is a portion of the lens plate 62 (ferrule 60) that is recessed rearward of the front end face 65A.

The inner surface 65 of the recess 63 is constituted by side surfaces 66, a bottom surface 67, and a lens surface 68. The side surfaces 66 are faces located at the side surfaces of the inner surface 65 of the recess 63. The bottom surface 67 is the face located at the bottom surface of the inner surface 65 of the recess 63. The lenses 64 are arranged on the bottom surface 67. The lens surface 68 is constituted by the surfaces of the lenses 64.

If foreign matter such as waste enters between two ferrules 60, it may adhere to the inner surface 65 of the recess 63 of the lens plate 62. If foreign matter adheres to the inner surface 65 of the recess 63, it may cause an increase in the amount of coupling loss. The cleaning tool 10 of one or more embodiments can remove such foreign matter that has adhered to the inner surface 65 of the recess 63. In the following description, when it is said that the cleaning tool 10 of one or more embodiments "cleans the ferrule 60", this means it "cleans the inner surface 65 of the recess 63 of the lens plate 62". However, the cleaning tool 10 of one or more embodiments may clean a portion other than the inner surface 65 of the recess 63 of the lens plate 62, such as the front end face 65A.

The front end face 65A is the abutting surface when two ferrules 60 are connected face-to-face with each other. The front end face 65A may be referred to as the abutting surface 65A. The recess 63 is formed in the central portion of the front end face 65A. An edge 65B is located at the boundary between the front end face 65A and the recess 63.

Cleaning Body

The cleaning body 1 used in the cleaning tool 10 of one or more embodiments is a member for cleaning the ferrule 60. The cleaning body 1 is constituted by an adhesive body that adheres foreign matter on the ferrule 60. Note that the adhesive body constituting the cleaning body 1 has self-adhesiveness. Here, self-adhesiveness means that the strength of adhesion of the cleaning body 1 to another member is smaller than the breaking strength of the cleaning body 1, and that even if the cleaning body 1 is adhered to another member and then peeled off, the adhesive body constituting the cleaning body 1 is not transferred to the partner member.

As shown in FIG. 1, in one or more embodiments, the face of the cleaning body 1 that is pressed against the inner surface 65 (side surfaces 66, bottom surface 67, and lens surface 68) of the recess 63 of the lens plate 62 is a contact surface 2. By bringing the contact surface 2 into contact with the inner surface 65, foreign matter on the inner surface 65 becomes adhered to the adhesive face, and the foreign matter is removed from the inner surface 65. Also, when the cleaning body 1 is brought into contact with the inner surface 65 and then peeled off, a portion of the cleaning body 1 is not transferred to the inner surface 65.

In one or more embodiments, the inner surface 65 of the recess 63 of the lens plate 62 is not formed by only flat faces. In particular, protruding portions (lens surface 68) are formed on the bottom surface 67 on which the lenses 64 are arranged. If the inner surface 65 has such protruding portions, the entirety of the inner surface 65 can be more properly cleaned by pressing the adhesive body than by performing wiping with a cleaning cloth or a cleaning thread. In view of this, the cleaning tool 10 of one or more embodiments uses the cleaning body 1 formed by the tape-shaped adhesive body, and therefore the cleaning body 1 can be brought into contact with the entirety of the inner surface 65, including the lens surface 68. It should be noted that the cleaning tool 10 of one or more embodiments is not required to use the cleaning body 1 formed by the tape-shaped adhesive body, and may use a cleaning cloth or a cleaning thread.

The adhesive body constituting the cleaning body 1 is constituted by an adhesive member made of a silicone-based adhesive in order to trap foreign matter. This adhesive body may be obtained by adding an adhesive agent to a main agent, whereby examples of the main agent include a copolymer containing a polyolefin or a monomer such as polyethylene or polypropylene, and examples of the adhesive added to the main agent include a synthetic rubber such as natural rubber, butyl rubber, or acrylic rubber, and a mixture of polyvinyl chloride and a plasticizer.

Figure 5A:
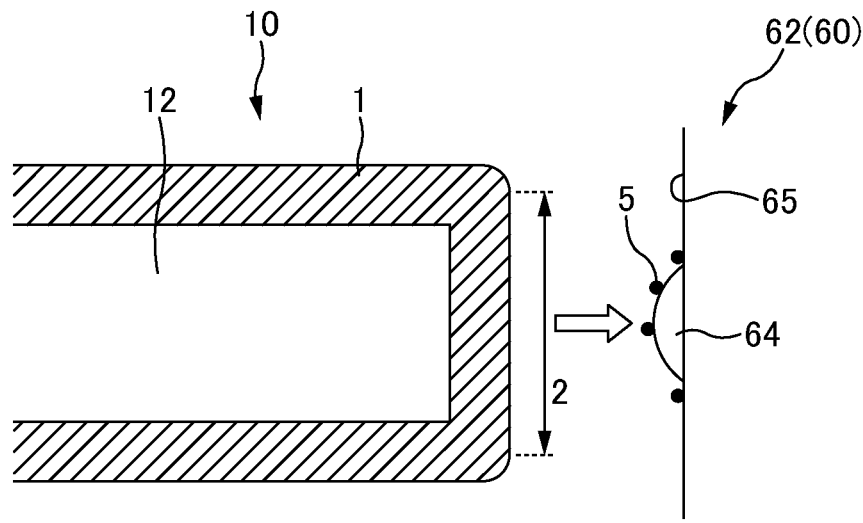
FIGS. 5A to 5C are illustrative views showing how a cleaning body 1 formed by a tape-shaped adhesive body is used to clean the lens plate 62.
Figure 5B:
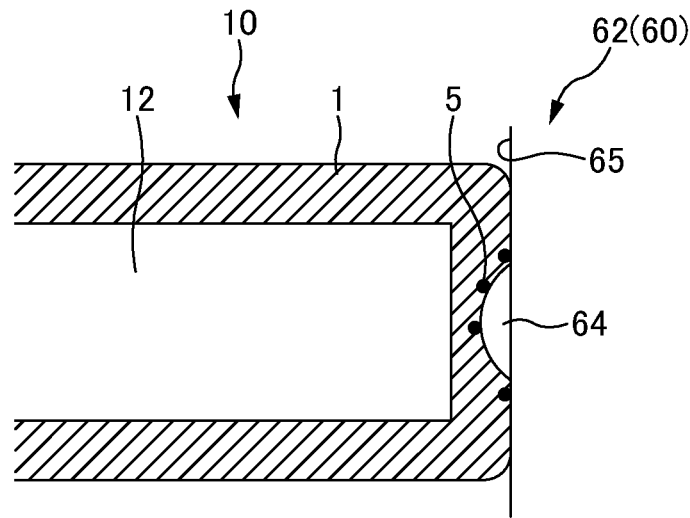
Figure 5C:
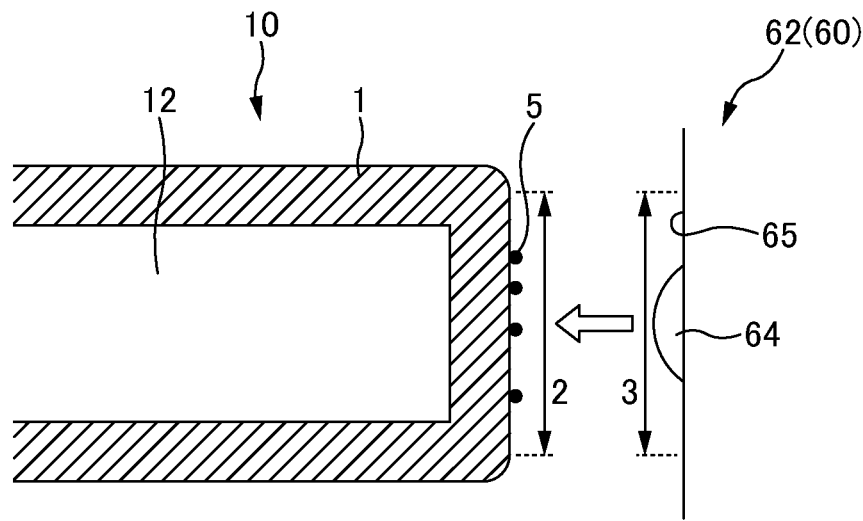

FIGS. 5A to 5C are illustrative views showing how the cleaning body 1 formed by the tape-shaped adhesive body is used to clean the lens plate 62.

As shown in FIG. 5A, the cleaning body 1 used in the cleaning tool 10 of one or more embodiments is tape-shaped. The tape-shaped cleaning body 1 is wrapped around the head 12. The aforementioned feeding mechanism 13 can supply the unused portion of the cleaning body 1 to the head 12 from the upstream side and convey the used portion of the cleaning body 1 to the downstream side. In the following description, the portion of the cleaning body 1 that has come into contact with the inner surface 65 and been peeled off the inner surface 65 one or more times may be referred to as the "used" portion of the cleaning body 1. Also, the portion of the cleaning body 1 that has never come into contact with the inner surface 65 and been peeled off the inner surface 65 may be referred to as the "unused" portion of the cleaning body 1. When an unused portion of the cleaning body 1 is used for cleaning and becomes a used portion of the cleaning body 1, the adhesive strength of the cleaning body 1 may decrease due to the adsorption of foreign matter to the cleaning body 1. In this case, it is necessary to supply an unused portion of the cleaning body 1 from the upstream side and convey the used portion of the cleaning body 1 to the downstream side. Also, the supply of the unused portion of the cleaning body 1 from the upstream side or the conveying of the used portion of the cleaning body 1 to the downstream side may be collectively referred to as "conveying" of the cleaning body 1. Also, the direction in which the cleaning body 1 is conveyed may be referred to as the "conveying direction".

One surface of the cleaning body 1 used in the cleaning tool 10 of one or more embodiments is formed by an adhesive surface formed by an adhesive body that has self-adhesiveness, and the other surface is formed by a non-adhesive surface that does not have adhesiveness. As shown in FIG. 5A, in the cleaning body 1 used in the cleaning tool 10 of one or more embodiments, the surface on the outer side (the side that comes into contact with the inner surface 65) is formed by an adhesive surface, and the surface on the inward side (the side that comes into contact with the head 12) is formed by a non-adhesive surface. Because the surface on the side in contact with the head 12 is formed by a non-adhesive surface, the cleaning body 1 can move along the head 12 without adhering to the head 12. FIG. 5A shows the state before cleaning the inner surface 65 of the recess 63 of the lens plate 62. As shown in FIG. 5A, waste 5 is attached to the inner surface 65. In the following description, waste 5 is a general term for waste matter such as fiber waste, dust, or sebum.

FIG. 5B shows a state when the contact surface 2 has been brought into contact with the inner surface 65 of the recess 63 of the lens plate 62. Foreign matter on the inner surface 65 becomes adhered to the cleaning body 1 due to the self-adhesiveness of the cleaning body 1.

FIG. 5C shows a state when the contact surface 2 has been peeled off the inner surface 65. Due to the self-adhesiveness of the cleaning body 1, it is possible to suppress the transfer of the adhesive body that forms the cleaning body 1 to the inner surface 65. The waste 5 on the inner surface 65 has become adhered to the contact surface 2. As shown in FIG. 5C, waste 5 has become adhered to the contact surface 2 of the cleaning body 1. In other words, this surface is a used portion of the cleaning body 1. Accordingly, if the contact surface 2 is brought into contact with another inner surface 65 in this state, the contact surface 2 having a lower adhesive force is brought into contact with the other inner surface 65, and therefore waste 5 may not properly become adhered. Also, if the contact surface 2 is brought into contact with another inner surface 65 in this state, the waste 5 that has adhered to the contact surface 2 may become re-attached to the other inner surface 65. For this reason, an unused portion of the cleaning body 1 is supplied from the upstream side by the feeding mechanism 13, and the used portion of the cleaning body 1 is conveyed to the downstream side.

Situation of Cleaning with Cleaning Tool 10 in Comparative Example

FIGS. 6A to 6D are illustrative views showing how the cleaning tool 10 of a comparative example is used to clean the lens plate 62. Note that the right side in FIGS. 6A and 6D shows the state of the front surface of the lens plate 62 of the ferrule 60 at corresponding time points.

As shown in FIG. 6A, in the cleaning tool 10 of the comparative example, the cleaning body 1 is wrapped around the head 12. However, in the cleaning tool 10 of the comparative example, the head 12 does not have the projection 22, and there is no member that projects from the head body side pressing surface 36 of the head 12. For this reason, the cleaning body 1 wrapped around the head 12 has a larger curvature at the leading end portion of the head 12 than the cleaning tool 10 of one or more embodiments.

Also, as shown in FIG. 6A, waste 5 is attached to the inner surface 65 of the recess 63 of the lens plate 62 (ferrule 60). If waste 5 is attached to the inner surface 65 in this way, it may cause an increase in coupling loss. Therefore, it is necessary to remove the waste 5 with the cleaning tool 10.

When the operator moves the head 12 (cleaning tool 10) toward the lens plate 62, the cleaning body 1 at the leading end portion of the head 12 comes into contact with the lens plate 62 as shown in FIG. 6B. At this time, as described above, the cleaning tool 10 of the comparative example has a larger curvature at the leading end portion of the head 12 than the cleaning tool 10 of one or more embodiments, and therefore the cleaning body 1 may come into contact with the edge 65B before coming into contact with the inner surface 65. In this case, as shown in FIG. 6B, air 6 becomes trapped between the cleaning body 1 and the inner surface 65 of the recess 63. Even if the operator attempts to move the head 12 (cleaning tool 10) closer to the lens plate 62 in this state, as shown in FIG. 6C, the cleaning body 1 cannot be pressed against the entirety of the inner surface 65 of the recess 63 due to the presence of the air 6.

As shown in FIG. 6D, when the operator moves the head 12 (cleaning tool 10) away from the lens plate 62, the cleaning body 1 is peeled off the inner surface 65 of the recess 63. The waste 5 attached to the inner surface 65 of the recess 63 thus becomes adhered to the contact surface 2. However, in the region of the inner surface 65 that was not pressed by the cleaning body 1, the waste 5 has not become adhered to the contact surface 2, and the waste 5 remains on the inner surface 65 of the recess 63. As shown in FIG. 6D, the waste 5 attached to the center of the inner surface 65 of the recess 63 in the up-down direction has become adhered to the contact surface 2. However, the waste 5 attached to the upper end region of the inner surface 65 of the recess 63 and the lower end region of the inner surface 65 of the recess 63 has not become adhered to the contact surface 2, and the waste 5 remains on the inner surface 65 of the recess 63. In other words, as shown in the figure on the right side of FIG. 6D, a cleaning range 3 is smaller in the case of the cleaning tool 10 of the comparative example.

Situation of Cleaning with Cleaning Tool 10 of One or More Embodiments

FIGS. 7A to 7D are illustrative views showing how the cleaning tool 10 of one or more embodiments is used to clean the lens plate 62. Note that the right side in FIGS. 7A and 7D shows the state of the front surface of the lens plate 62 of the ferrule 60 at corresponding time points.

As shown in FIG. 7A, in the cleaning tool 10 of one or more embodiments, the cleaning body 1 is wrapped around the head 12. Also, in the cleaning tool 10 of one or more embodiments, the head 12 includes the head body 21 and the projection 22 that projects from the head body 21. In the cleaning body 1 wrapped around the head 12, the curvature of the cleaning body 1 at the leading end portion of the head 12 is smaller than in the case of the cleaning tool 10 of the comparative example, by an amount corresponding to the height of the projection 22 that projects from the head body side pressing surface 36 of the head body 21.

When the operator moves the head 12 (cleaning tool 10) toward the lens plate 62, the cleaning body 1 at the leading end portion of the head 12 comes into contact with the lens plate 62, as shown in FIG. 7B. At this time, as described above, in the cleaning tool 10 of one or more embodiments, the curvature of the cleaning body 1 at the leading end portion of the head 12 is smaller than the case of the cleaning tool 10 of the comparative example, and thus the cleaning body 1 first comes into contact with the center portion of the inner surface 65 of the recess 63 in the up-down direction, and does not come into contact with the edge 65B. Accordingly, as shown in FIG. 7B, the case where air 6 becomes trapped between the cleaning body 1 and the inner surface 65 of the recess 63 is suppressed. In other words, a gap that allows the escape of the air 6 is formed between the cleaning body 1 and the edge 65B. Note that in the state shown in FIG. 7B, the projection side pressing surface 37 of the projection 22 presses the cleaning body 1 against the inner surface 65 of the recess 63. In the state shown in FIG. 7B, the cleaning body 1 only comes into contact with the center portion of the inner surface 65 of the recess 63 in the up-down direction, and the cleaning body 1 has not yet come into contact with the upper end region of the inner surface 65 of the recess 63 or the lower end region of the inner surface 65 of the recess 63.

When the operator moves the head 12 (cleaning tool 10) further toward the lens plate 62 from the state shown in FIG. 7B, the projection 22 that is in contact with the inner surface 65 of the recess 63 is subjected to a rearward pressing force from the inner surface 65 of the recess 63. As described above, because the projection 22 can move relative to the head body 21, the projection 22 moves rearward relative to the head body 21 due to the pressing force received from the inner surface 65 of the recess 63 (i.e., moves in the direction opposite to the projecting direction of the projection 22). At this time, the projection 22 moves rearward against the elastic force of the spring for projection 27. Note that in one or more embodiments, the elastic force of the spring for head 26 is stronger than the elastic force of the spring for projection 27, and therefore the spring for projection 27 becomes compressed before the spring for head 26 shown in FIG. 1 becomes compressed.

Accordingly, as shown in FIG. 7C, the cleaning body 1 is pressed against the inner surface 65 by the head body side pressing surface 36 of the head body 21 that has moved forward relative to the projection 22. At this time, the cleaning body 1 is already in contact with the center portion of the inner surface 65 of the recess 63 in the up-down direction due to the projection side pressing surface 37, and successively comes into contact with the inner surface 65 of the recess 63 in the upward direction and downward direction. For this reason, the case where air 6 becomes trapped between the cleaning body 1 and the inner surface 65 of the recess 63 is suppressed. In one or more embodiments, the case where the air 6 becomes trapped between the cleaning body 1 and the inner surface 65 of the recess 63 is suppressed, and therefore, as shown in FIG. 7C, the cleaning body 1 can be pressed against the entirety of the inner surface 65 of the recess 63.

Note that in the state shown in FIG. 7C, the spring for head 26, which has a stronger elastic force than the spring for projection 27, begins to become compressed. In other words, the entirety of the head 12 can be moved rearward. As a result, the cleaning body 1, which is wrapped around the head 12, can be pressed against the ferrule 60 with a predetermined pressing force.

As shown in FIG. 7D, when the operator moves the head 12 (cleaning tool 10) away from the lens plate 62, the cleaning body 1 becomes peeled off the inner surface 65 of the recess 63. The waste 5 stayed on the inner surface 65 of the recess 63 is adhered to the contact surface 2. In one or more embodiments, the cleaning body 1 can be pressed against the entirety of the inner surface 65 of the recess 63, and thus the waste 5 that has adhered to the entire inner surface 65 of the recess 63 becomes adhered to the contact surface 2 as shown in FIG. 6D. In other words, as shown in the figure on the right side of FIG. 6D, it is possible to suppress a reduction in the size of the cleaning range 3 in contrast to the cleaning tool 10 of the comparative example.

As described above, in the cleaning tool 10 of one or more embodiments, the projection side pressing surface 37 is arranged at the central portion of the head body side pressing surface 36. At the time of cleaning, the projection side pressing surface 37 projects from the head body side pressing surface 36. Accordingly, the curvature of the cleaning body 1 at the leading end portion of the head 12 can be reduced, and the cleaning body 1 can be brought into contact with the inner surface 65 of the recess 63 before coming into contact with the edge 65B. In other words, it is possible to suppress the case where the air 6 becomes trapped between the cleaning body 1 and the inner surface 65 of the recess 63. Accordingly, the cleaning body 1 can be pressed against the entirety of the inner surface 65 of the recess 63, and it is possible to suppress a reduction in the size of the cleaning range 3.

Note that as described above, in the cleaning tool 10 of one or more embodiments, the projecting end portion of the projection 22 has a tapered shape. Accordingly, a gap that allows the air 6 to escape is also formed between the cleaning body 1 and the edge 65B, thus making it possible to further suppress the case where the air 6 becomes trapped between the cleaning body 1 and the inner surface 65 of the recess 63.

Variations

Figure 8A:
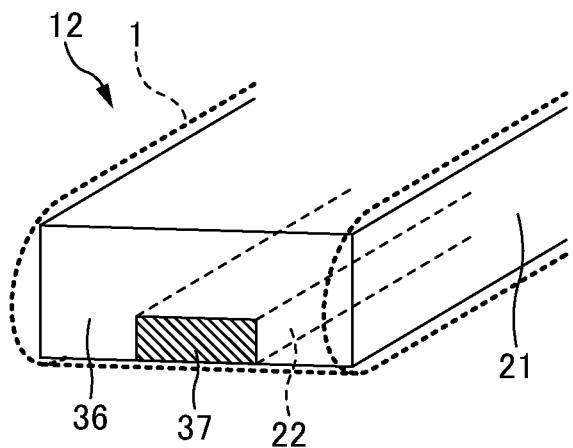
FIGS. 8A to 8C are perspective views showing variations of the head 12.
Figure 8B:
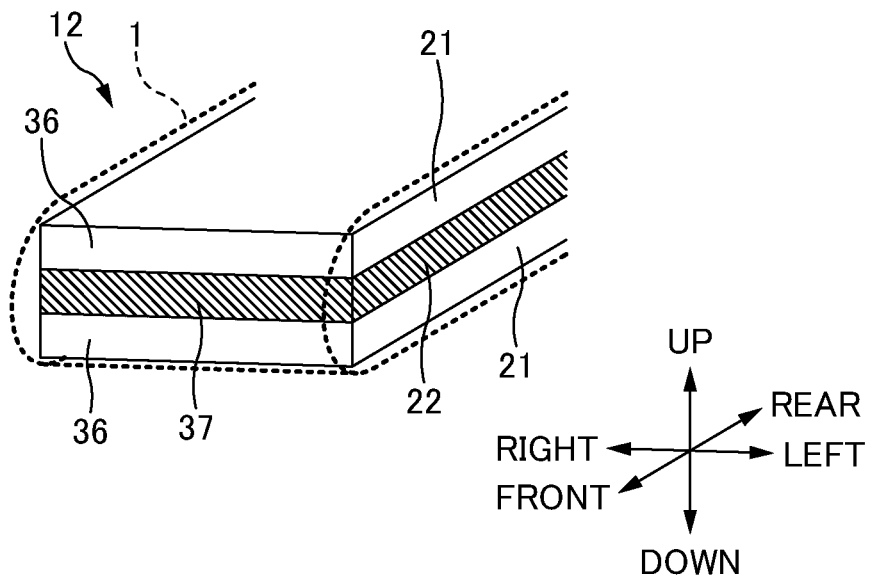
Figure 8C:
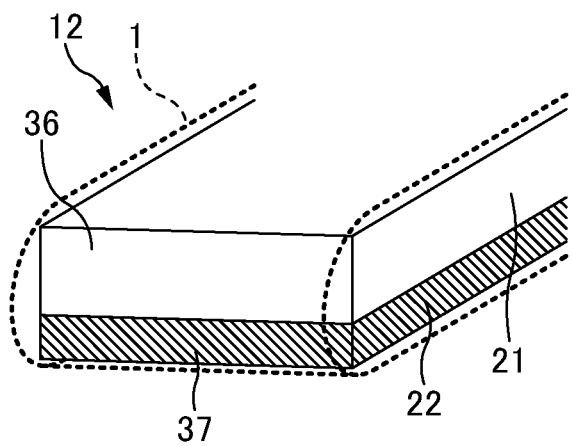

FIGS. 8A to 8C are perspective views showing variations of the head 12. As long as the curvature of the cleaning body 1 at the leading end portion of the head 12 can be reduced and the cleaning body 1 can be brought into contact with the inner surface 65 of the recess 63 before coming into contact with the edge 65B, the configuration of the head 12 is not limited to the configuration described above. The cleaning tool 10 having the head 12 according to the variation shown in FIGS. 8A to 8C can also suppress the case where the air 6 becomes trapped between the cleaning body 1 and the inner surface 65 of the recess 63. Accordingly, the cleaning body 1 can be pressed against the entirety of the inner surface 65 of the recess 63, and it is possible to suppress a reduction in the size of the cleaning range 3.

In FIG. 8A, the projection side pressing surface 37 is arranged at the center of the head body side pressing surface 36 in the left-right direction, but is located at the lower end of the head body side pressing surface 36. Note that a configuration is possible in which the projection side pressing surface 37 is arranged at the center of the head body side pressing surface 36 in the left-right direction, but is located at the upper end of the head body side pressing surface 36.

In FIG. 8B, the projection side pressing surface 37 is arranged at the center of the head body side pressing surface 36 in the up-down direction, but extends from the left end of the head body side pressing surface 36 to the right end of the same. With this configuration as well, when the projection side pressing surface 37 projects from the head body side pressing surface 36, the curvature of the cleaning body 1 at the leading end portion of the head 12 can be reduced, and thus the cleaning body 1 can come into contact with the inner surface 65 before coming into contact with the edge 65B.

In FIG. 8C, the projection side pressing surface 37 extends from the left end of the head body side pressing surface 36 to the right end of the same, and is located at the lower end of the head body side pressing surface 36. With this configuration as well, when the projection side pressing surface 37 projects from the head body side pressing surface 36, the curvature of the cleaning body 1 at the leading end portion of the head 12 can be reduced, and thus the cleaning body 1 can come into contact with the inner surface 65 before coming into contact with the edge 65B.

Situation of Cleaning with Cleaning Tool 10 of Reference Example

Figure 9A:
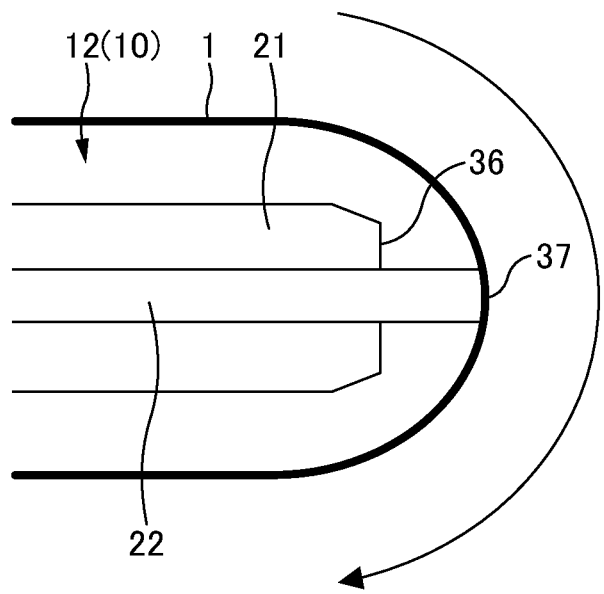
FIGS. 9A and 9B are illustrative views showing how the cleaning body 1 is conveyed in the cleaning tool 10 of a reference example.
Figure 9B:
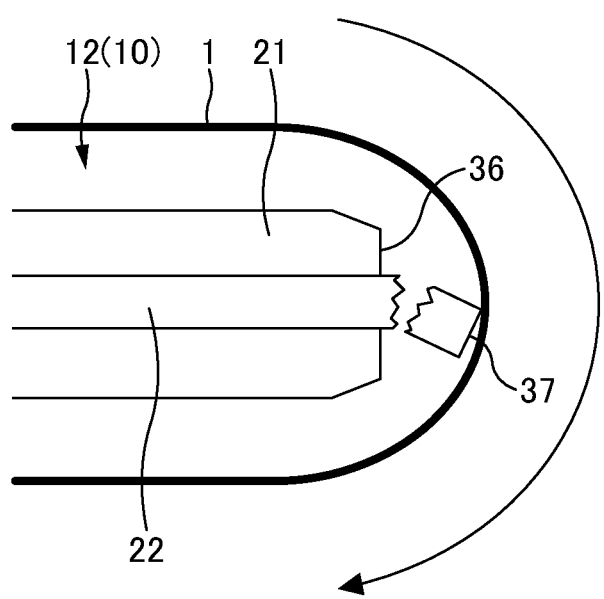

FIGS. 9A and 9B are illustrative views showing how the cleaning body 1 is conveyed in the cleaning tool 10 of a reference example.

In the cleaning tool 10 of the reference example shown in FIG. 9A, the projection 22 projects a large amount from the head body 21. Specifically, in the cleaning tool 10 of the reference example shown in FIG. 9A, the projection side pressing surface 37 projects a large amount from the head body side pressing surface 36. FIG. 9A shows the situation of conveying of the cleaning body 1 to the head 12 in this state. When the cleaning body 1 is conveyed to the head 12, the cleaning body 1 moves in the direction indicated by the arrow in FIG. 9A. At this time, because the projection side pressing surface 37 projects from the head body side pressing surface 36, the cleaning body 1 generates friction at the projection side pressing surface 37 when moving.

At this time, frictional force is applied to the leading end portion of the projection 22 in the conveying direction of the cleaning body 1, which is perpendicular to the projecting direction of the projection 22. Due to such frictional force, as shown in FIG. 9B, the leading end of the projection 22 may become damaged due to the cleaning body 1 being conveyed while the projection side pressing surface 37 projects a large amount from the head body side pressing surface 36.

Situation of Cleaning with Cleaning Tool 10 of One or More Embodiments

Figure 10A:
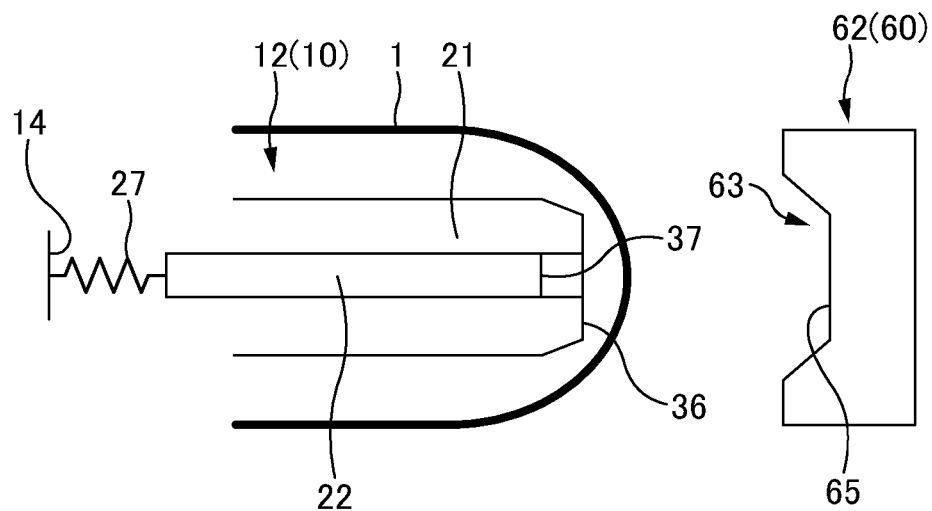
FIGS. 10A to 10C are illustrative views showing the first half of how the cleaning tool 10 of one or more embodiments is used to clean the lens plate 62.
Figure 10B:
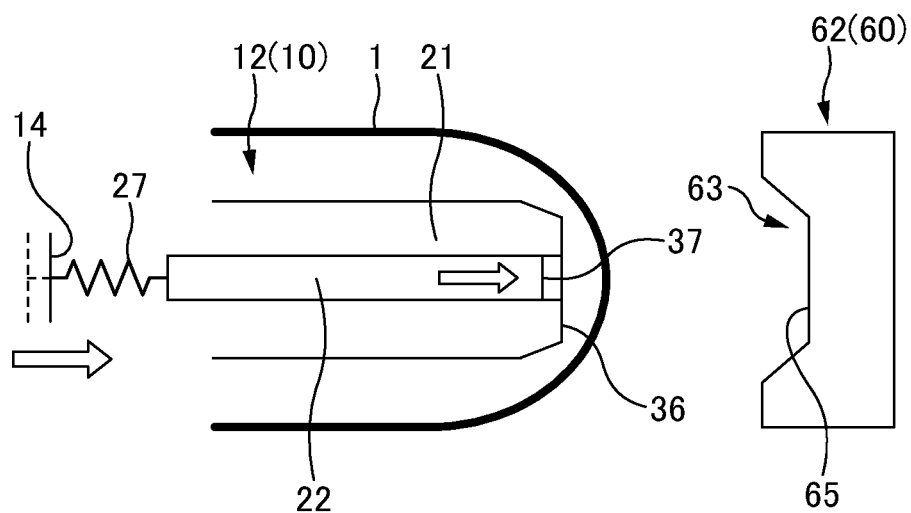
Figure 10C:
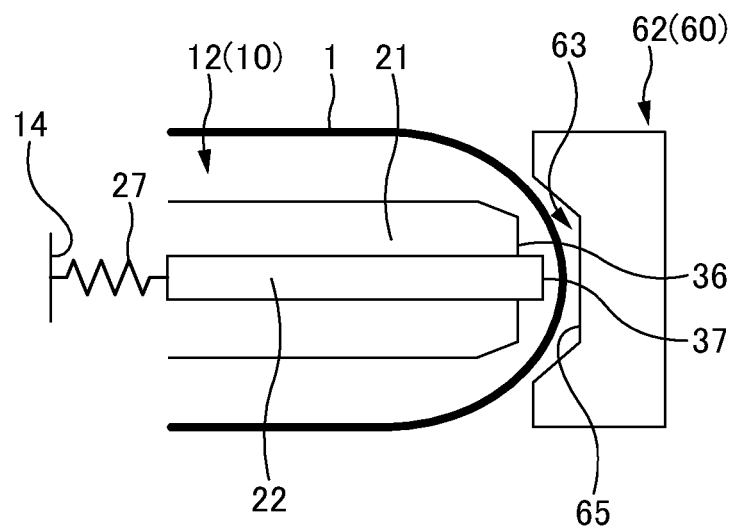

FIGS. 10A to 10C are illustrative views showing the first half of how the cleaning tool 10 of one or more embodiments is used to clean the lens plate 62.

FIG. 10A shows the cleaning tool 10 of one or more embodiments before cleaning the ferrule 60. In the cleaning tool 10 of one or more embodiments, the head 12 includes the head body 21, the projection 22, and the spring for projection 27, similarly to the cleaning tool 10 of the above-described embodiments. Also, in the cleaning tool 10 of one or more embodiments, the projection 22 can move relative to the head body 21, similarly to the cleaning tool 10 of the above-described embodiments. However, before the ferrule 60 shown in FIG. 10A is cleaned, the projection side pressing surface 37 of the projection 22 does not protrude from the head body side pressing surface 36 of the head body 21 (i.e., is in a retracted state). Also, in the cleaning tool 10 of one or more embodiments, the rear end portion of the spring for projection 27 is held by a receiving portion 14 of spring for projection. Here, unlike the cleaning tool 10 of the above-described embodiments, the receiving portion 14 of spring for projection is located separately from the head body 21. In other words, the receiving portion 14 of spring for projection can move relative to the head body 21. Accordingly, in the cleaning tool 10 of one or more embodiments, the receiving portion 14 of spring for projection, the spring for projection 27, and the projection 22 can integrally move relative to the head body 21.

When the operator moves the head 12 (cleaning tool 10) toward the lens plate 62, the receiving portion 14 of spring for projection moves toward the lens plate 62 as shown in FIG. 10B. Accordingly, the projection 22 also moves toward the lens plate 62 via the spring for projection 27. Because the projection 22 can move relative to the head body 21, as the receiving portion 14 of spring for projection moves toward the lens plate 62, the projection 22 moves toward the lens plate 62 relative to the head body 21. In other words, the projection 22 moves in the direction of projecting from the head body 21. Accordingly, as shown in FIG. 10C, the projection side pressing surface 37 projects from the head body side pressing surface 36.

Note that the situation of the cleaning of the ferrule 60 in the state shown in FIG. 10C and thereafter is the same as the situation of the cleaning with the cleaning tool 10 of the above-described embodiments shown in FIGS. 7A to 7D. In other words, with the cleaning tool 10 of one or more embodiments, the projection side pressing surface 37 is arranged at the central portion of the head body side pressing surface 36. When cleaning is to be performed, the projection side pressing surface 37 projects from the head body side pressing surface 36. Accordingly, the curvature of the cleaning body 1 at the leading end portion of the head 12 can be reduced, and the cleaning body 1 can be brought into contact with the inner surface 65 of the recess 63 before coming into contact with the edge 65B. In other words, it is possible to suppress the case where the air 6 becomes trapped between the cleaning body 1 and the inner surface 65 of the recess 63.

Accordingly, the cleaning body 1 can be pressed against the entirety of the inner surface 65 of the recess 63, and it is possible to suppress a reduction in the size of the cleaning range 3.

Figure 11A:
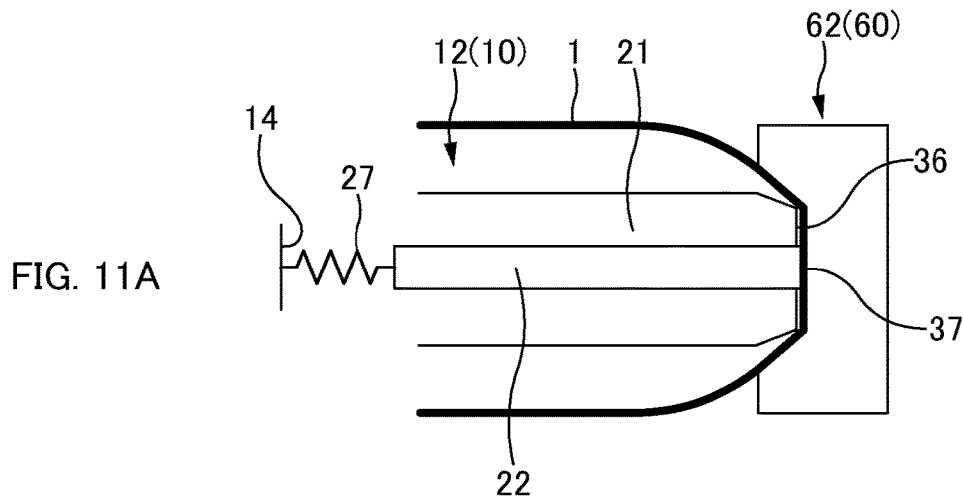
FIGS. 11A to 11C are illustrative views showing the second half of how the cleaning tool 10 of one or more embodiments is used to clean the lens plate 62.
Figure 11B:
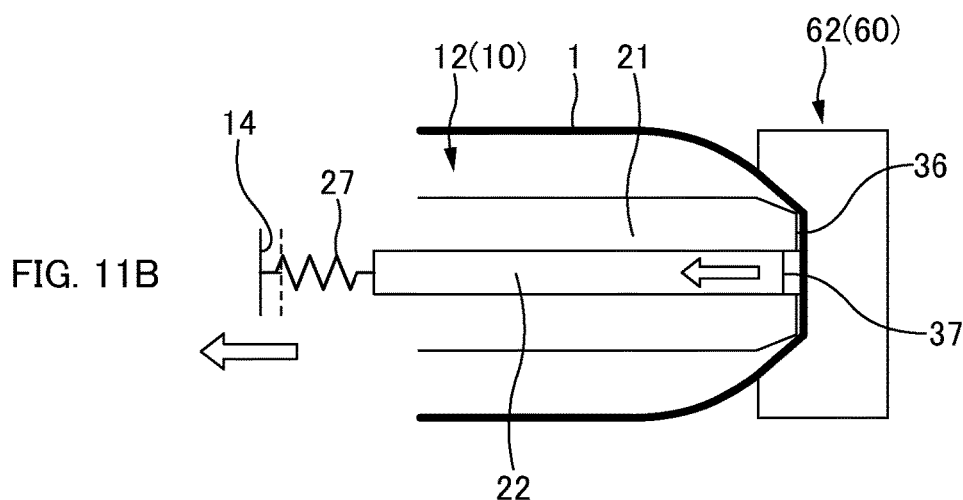
Figure 11C:
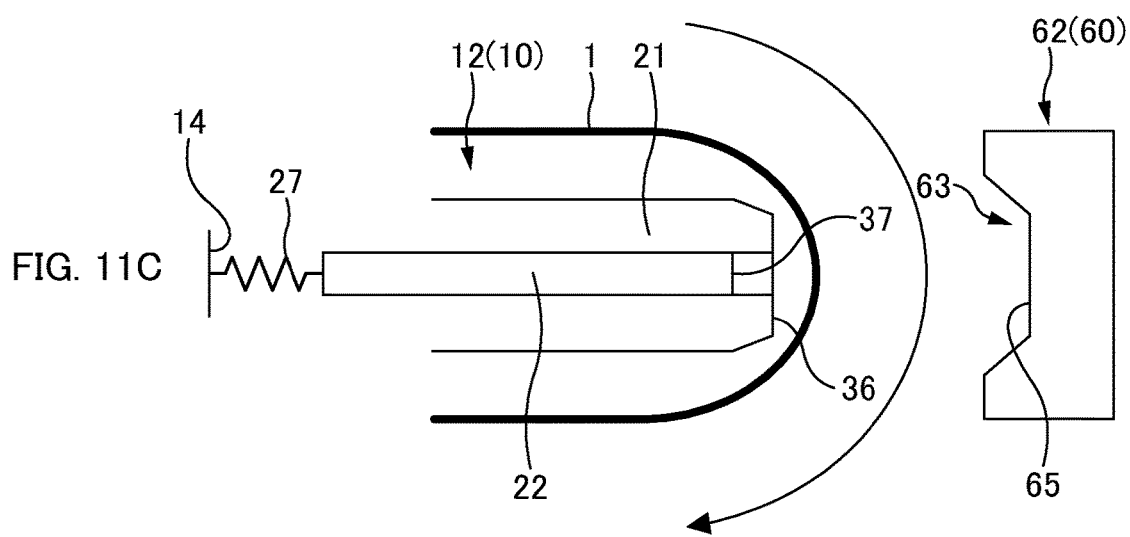

FIGS. 11A to 11C are illustrative views showing the second half of how the cleaning tool 10 of one or more embodiments is used to clean the lens plate 62.

FIG. 11A shows the state of the cleaning tool 10 of one or more embodiments immediately after the cleaning body 1 is pressed against the inner surface 65 of the recess 63. In the state shown in FIG. 11A, the projection side pressing surface 37 of the projection 22 projects from the head body side pressing surface 36 of the head body 21. When the operator moves the head 12 (cleaning tool 10) in the state shown in FIG. 11A away from the lens plate 62, the receiving portion 14 of spring for projection moves away from the lens plate 62 as shown in FIG. 11B. As a result, the projection 22 also moves away from the lens plate 62 via the spring for projection 27. Because the projection 22 can move relative to the head body 21, as the receiving portion 14 of spring for projection moves away from the lens plate 62, the projection 22 moves away from the lens plate 62 relative to the head body 21. In other words, the projection 22 moves in the direction of retracting from the head body 21. Accordingly, as shown in FIG. 11C, the projection side pressing surface 37 retracts from the head body side pressing surface 36. Note that in the state shown in FIG. 11C, the positional relationship between the projection 22 and the head body 21 is the same as that in the state shown in FIG. 10A. In other words, in the state shown in FIG. 11C, the state has returned to the state shown in FIG. 10A. Specifically, in the state shown in FIG. 11C, the projection side pressing surface 37 of the projection 22 does not project from the head body side pressing surface 36 of the head body 21 (i.e., is in the retracted state).

In one or more embodiments, the cleaning body 1 is conveyed to the head 12 after the projection side pressing surface 37 has retracted from the head body side pressing surface 36. When the cleaning body 1 is conveyed to the head 12, the cleaning body 1 moves in the direction indicated by the arrow in FIG. 11C. At this time, the projection side pressing surface 37 has retracted from the head body side pressing surface 36, and thus the cleaning body 1 moves over the head body side pressing surface 36. As a result, it is possible to suppress damage to the leading end portion of the projection 22.

Note that in the above description, the cleaning body 1 is conveyed to the head 12 after the projection side pressing surface 37 has retracted from the head body side pressing surface 36, but the cleaning body 1 may be conveyed to the head 12 before the projection side pressing surface 37 projects from the head body side pressing surface 36 before the cleaning of the ferrule 60. For example, the cleaning body 1 may be conveyed to the head 12 in the state shown in FIG. 11A. This also makes it possible to suppress the leading end portion of the projection 22 from being damaged.

Note that in one or more embodiments, a configuration is possible in which the projection side pressing surface 37 of the projection 22 is not retracted from the head body side pressing surface 36 of the head body 21 before conveying the cleaning body 1 to the head 12. Conveying may be performed in a state in which the projection side pressing surface 37 and the head body side pressing surface 36 are flush with no level difference, or in a state in which the projection side pressing surface 37 projects a small amount from the head body side pressing surface 36. The cleaning body 1 may be conveyed to the head 12 when the projection side pressing surface 37 has moved rearward from a state in which the projection side pressing surface 37 projects a large amount from the head body side pressing surface 36. In other words, before the head 12 is pressed against the ferrule 60, there may be a change from a state in which the projection side pressing surface 37 is at a predetermined position relative to the head body side pressing surface 36 (hereinafter, may be referred to as the "first state") to a second state in which the projection side pressing surface 37 projects from the head body side pressing surface 36 a greater amount than in the first state. The feeding mechanism 13 may convey the cleaning body 1 to the head 12 in the first state. This also makes it possible to suppress damage to the leading end portion of the projection 22.

Figure 12A:
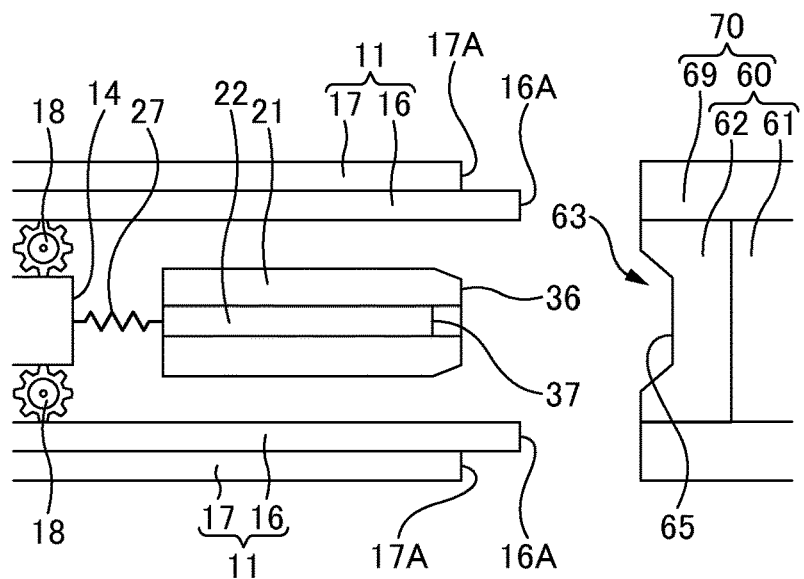
FIGS. 12A to 12C are illustrative views showing an example of a projection mechanism of the cleaning tool 10 of one or more embodiments.
Figure 12B:
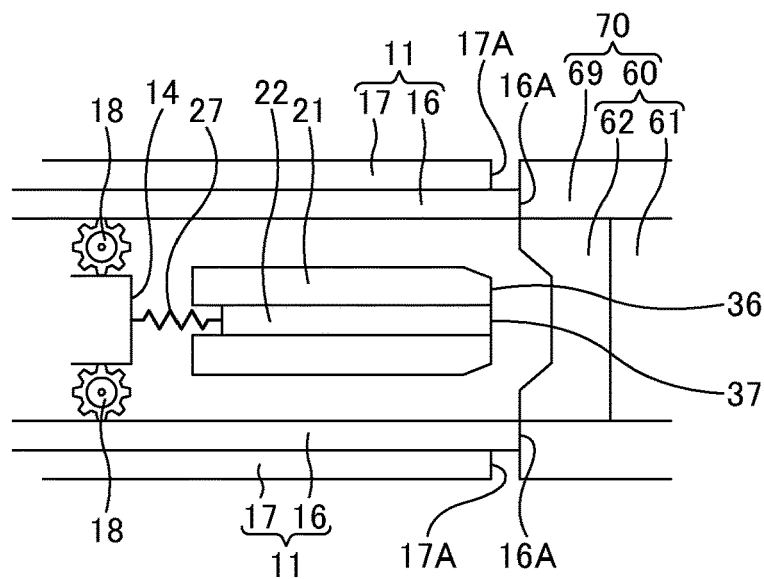
Figure 12C:
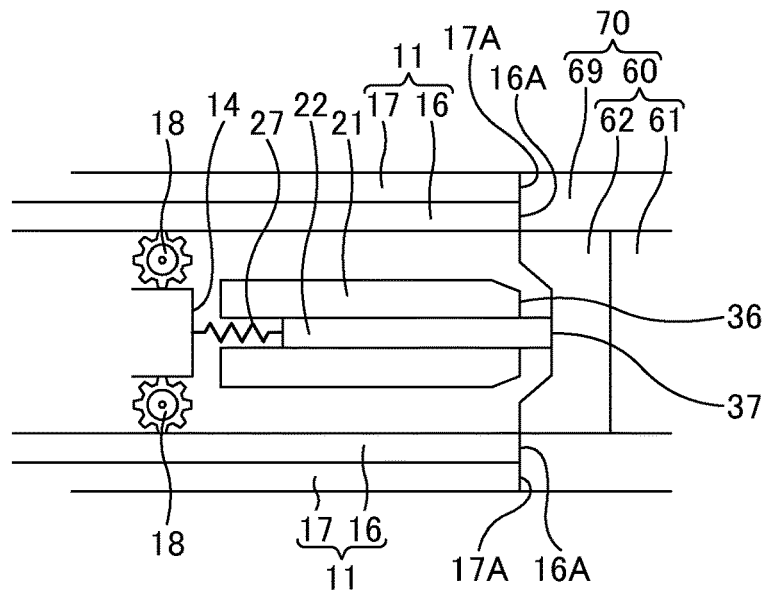

FIGS. 12A to 12C are illustrative views showing an example of a projection mechanism of the cleaning tool 10 of one or more embodiments.

As described above, in the cleaning tool 10 of one or more embodiments, the receiving portion 14 of spring for projection, the spring for projection 27, and the projection 22 can integrally move relative to the head body 21. FIGS. 12A to 12C show an example of a projection mechanism in which the receiving portion 14 of spring for projection, the spring for projection 27, and the projection 22 project (and retract) relative to the head body 21.

As shown in FIG. 12A, the cleaning tool 10 of one or more embodiments further includes a tube body 11. The tube body 11 is a member that houses inside the head 12. The tube body 11 has an inner housing portion 16 and an outer housing portion 17.

The inner housing portion 16 is a member that houses inside the head 12. Also, the inner housing portion 16 can move relative to the outer housing portion 17. The inner housing portion 16 has an inner end face 16A at the front end face. The inner end face 16A is a portion that comes into contact with a housing 69 of an optical connector 70, which will be described later. Note that the inner end face 16A is located in front of an outer end face 17A of the outer housing portion 17, which will be described later.

Rotating portions 18 are located between the inner housing portion 16 and the receiving portion 14 of spring for projection. The rotating portions 18 are members that convert motion (linear motion) of the inner housing portion 16 into motion (linear motion) of the receiving portion 14 of spring for projection in the opposite direction. The rotating portions 18 are fixed to the later-described outer housing portion 17. When the inner housing portion 16 moves rearward relative to the outer housing portion 17, the receiving portion 14 of spring for projection moves forward via the rotating portions 18. Also, when the inner housing portion 16 moves forward relative to the outer housing portion 17, the receiving portion 14 of spring for projection moves rearward via the rotating portions 18.

The outer housing portion 17 is a member that houses inside the inner housing portion 16. Also, the inner housing portion 16 can move while being housed in the outer housing portion 17. The outer housing portion 17 has the outer end face 17A at the front end face. The outer end face 17A is a portion that comes into contact with the housing 69 of the optical connector 70, which will be described later. Note that the outer end face 17A is located behind the inner end face 16A of the inner housing portion 16.

As shown in FIG. 12A, the ferrule 60 of one or more embodiments is further located with the housing 69. An optical connector 70 is constituted by the ferrule 60 and the housing 69. The housing 69 is a member that houses inside the ferrule 60. The inner end face 16A of the inner housing portion 16 and the outer end face 17A of the outer housing portion 17 come into contact with the housing 69.

FIG. 12A shows the cleaning tool 10 of one or more embodiments before cleaning the optical connector 70. When the operator moves the cleaning tool 10 toward the optical connector 70, as shown in FIG. 12B, the inner end face 16A of the inner housing portion 16, which is located in front of the outer end face 17A of the outer housing portion 17, comes into contact with the housing 69 of the optical connector 70. When the cleaning tool 10 is further moved toward the optical connector 70, the inner housing portion 16, which is in contact with the housing 69, is subjected to a rearward pressing force from the housing 69. As described above, the inner housing portion 16 can move relative to the outer housing portion 17, and therefore the inner housing portion 16 retracts from the outer housing portion 17 due to the pressing force received from the housing 69. Accordingly, as shown in FIG. 12B, when the inner housing portion 16 moves rearward, the receiving portion 14 of spring for projection moves forward via the rotating portions 18. Accordingly, the projection 22 also moves toward the optical connector 70 via the spring for projection 27. Because the projection 22 can move relative to the head body 21, as the receiving portion 14 of spring for projection moves toward the optical connector 70, the projection 22 moves toward the optical connector 70 relative to the head body 21. In other words, the projection 22 moves in the direction of projecting from the head body 21. Accordingly, as shown in FIG. 12C, the projection side pressing surface 37 projects from the head body side pressing surface 36.

When the operator moves the cleaning tool 10 toward the optical connector 70, as shown in FIG. 12C, the outer end face 17A of the outer housing portion 17 comes into contact with the housing 69 of the optical connector 70. Note that the inner end face 16A of the inner housing portion 16 also remains in contact with the housing 69 of the optical connector 70. When the cleaning tool 10 is further moved toward the optical connector 70, the outer housing portion 17 and the inner housing portion 16, which are in contact with the housing 69, are subjected to a rearward pressing force from the housing 69. Due to the pressing force received from the housing 69, the outer housing portion 17 and the inner housing portion 16 retract from the head 12. Accordingly, the head 12 moves forward relative to the outer housing portion 17 and the inner housing portion 16. Note that at this time, the rotating portions 18 do not operate because the outer housing portion 17 and the inner housing portion 16 move integrally. Accordingly, the projection 22 that projects from the head body 21 can be pressed against the optical connector 70.

The cleaning tool 10 of one or more embodiments is not required to have the projection mechanism shown in FIGS. 12A to 12C. For example, the receiving portion 14 of spring for projection, the spring for projection 27, and the projection 22 may be manually moved integrally so as to project from the head body 21.

Other Remarks

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

LIST OF REFERENCE NUMERALS 1 cleaning body, 2 contact surface, 3 cleaning range, 5 waste, 6 air, 10 cleaning tool, 11 tube body, 12 head, 13 feeding mechanism, 14 receiving portion of spring for projection, 16 inner housing portion, 16A inner end face, 17 outer housing portion, 17A outer end face, 18 rotating portion, 21 head body, 22 projection, 26 spring for head, 27 spring for projection, 31 supply reel, 31A supply reel support shaft, 32 take-up reel, 32A take-up reel support shaft, 36 head body side pressing surface, 37 projection side pressing surface, 38 tapered face, 60 ferrule, 61 ferrule body, 62 lens plate, 63 recess, 64 lens, 65 inner surface, 65A front end face (abutting surface), 65B edge, 66 side surface, 67 bottom surface, 68 lens surface, 69 housing, 70 optical connector

The invention claimed is:

1. A cleaning tool for cleaning an object to be cleaned comprising:
   a head; and
   a cleaning body wrapped around the head,
   wherein the head includes:
      a head body having a pressing surface that presses the cleaning body against the object to be cleaned; and
      a projection that projects from the pressing surface of the head body,
   wherein the projection is retractable relative to the head body,
   wherein the pressing surface includes:
      a head body side pressing surface disposed on the head body; and
      a projection side pressing surface disposed on the projection,
   wherein the head body side pressing surface and the projection side pressing surface are wrapped around by the cleaning body,
   wherein the projection is configured to switch between:
      a first state in which the projection side pressing surface is at a predetermined position relative to the head body side pressing surface; and
      a second state in which the projection side pressing surface projects from the head body side pressing surface by a greater amount than in the first state.

2. The cleaning tool according to claim 1,
   wherein the head further includes an elastic member that restores a positional relationship between the projection and the pressing surface of the head body.

3. The cleaning tool according to claim 1, wherein
   before the head is pressed against the object to be cleaned, the projection is configured in the second state, and
   after the head is pressed against the object to be cleaned, the projection is configured in the first state by retracting the projection into the head body.

4. The cleaning tool according to claim 3, further comprising:
   a feeding mechanism that conveys the cleaning body to the head in the first state.

5. The cleaning tool according to claim 3, further comprising:
   a tube body that is movable relative to the head, where the head is disposed inside the tube body,
   wherein the object to be cleaned includes an optical connector having a ferrule and a housing, where the ferrule is disposed inside the housing, and
   the first state is changed to the second state by the tube body coming into contact with the housing, being subjected to a pressing force from the housing, and retracting relative to the head.

6. The cleaning tool according to claim 1,
   the projection side pressing surface occupies one portion of a total region of the pressing surface of the head along a conveying direction of the cleaning body.

7. The cleaning tool according to claim 6,
   wherein the projection side pressing surface occupies one portion of the total region of the pressing surface of the head along a direction perpendicular to the conveying direction of the cleaning body.

8. The cleaning tool according to claim 6,
   wherein the object to be cleaned is a lens coupling type of ferrule in which a lens is arranged at a bottom surface of a recess formed in the ferrule.

9. The cleaning tool according to claim 8,
   wherein the cleaning body is constituted by a tape-shaped adhesive body.

10. The cleaning tool according to claim 1,
    wherein an end of the projection has a tapered shape.

* * * * *